United States Patent
Luten

(10) Patent No.: US 12,547,039 B2
(45) Date of Patent: Feb. 10, 2026

(54) ELECTRO-OPTIC ELEMENT ELECTRODE

(71) Applicant: GENTEX CORPORATION, Zeeland, MI (US)

(72) Inventor: Henry A. Luten, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 383 days.

(21) Appl. No.: 18/170,654

(22) Filed: Feb. 17, 2023

(65) Prior Publication Data

US 2023/0266632 A1 Aug. 24, 2023

Related U.S. Application Data

(60) Provisional application No. 63/311,721, filed on Feb. 18, 2022.

(51) Int. Cl.
| | | |
|---|---|---|
| *G02F 1/155* | (2006.01) | |
| *G02F 1/1335* | (2006.01) | |
| *G02F 1/1343* | (2006.01) | |
| *G02F 1/157* | (2006.01) | |

(52) U.S. Cl.
CPC ........ *G02F 1/155* (2013.01); *G02F 1/133502* (2013.01); *G02F 1/13439* (2013.01); *G02F 1/157* (2013.01)

(58) Field of Classification Search
None
See application file for complete search history.

(56) References Cited

U.S. PATENT DOCUMENTS

| | | | |
|---|---|---|---|
| 3,971,869 A | | 7/1976 | Gelber et al. |
| 6,429,417 B1 * | | 8/2002 | Street ................. G02B 26/0841 257/53 |
| 10,739,661 B2 * | | 8/2020 | Saenger Nayver ... G02F 1/1533 |
| 2002/0127408 A1 | | 9/2002 | Nishida et al. |
| 2011/0080629 A1 * | | 4/2011 | Neuman ................. G02F 1/155 359/265 |
| 2012/0105931 A1 * | | 5/2012 | Deri ....................... G02F 1/0311 359/257 |
| 2018/0017823 A1 * | | 1/2018 | Saenger Nayver ..... B60R 1/088 |

(Continued)

OTHER PUBLICATIONS

International Search Report dated Jun. 8, 2023, for corresponding PCT application No. PCT/US2023/062792, 4 pages.

(Continued)

*Primary Examiner* — Ryan Crockett
(74) *Attorney, Agent, or Firm* — Price Heneveld LLP; Brian James Brewer

(57) ABSTRACT

The present disclosure is directed to an electro-optic element having an electrode with a reduced reflectance construction. The electro-optic element may comprise a first substrate, a second substate disposed substantially parallel the first substate, a first electrode associated with the first substrate, a second electrode associated with the second substate, and an electro-optic medium disposed between the first and second electrodes. Additionally, the electrode having the reduced reflectance construction may have a first transparent conductive oxide layer, and a high refractive index layer disposed such the first transparent conductive oxide layer is between the high refractive index layer and the electro-optic medium. The high refractive index layer comprising titanium di-oxide.

19 Claims, 2 Drawing Sheets

(56) References Cited

U.S. PATENT DOCUMENTS

| | | | |
|---|---|---|---|
| 2020/0117069 A1* | 4/2020 | Telfer | G02B 26/005 |
| 2020/0209621 A1* | 7/2020 | Neuman | G02B 27/0101 |
| 2021/0072609 A1* | 3/2021 | Saenger Nayver | G02F 1/133502 |
| 2024/0201552 A1* | 6/2024 | Saenger Nayver | G02F 1/133502 |

OTHER PUBLICATIONS

Written Opinion dated Jun. 8, 2023, for corresponding PCT application No. PCT/US2023/062792, 5 pages.

* cited by examiner

ELECTRO-OPTIC ELEMENT ELECTRODE

CROSS-REFERENCE TO RELATED APPLICATIONS

This application claims priority under 35 U.S.C. § 119(e) to U.S. Provisional Application No. 63/311,721 filed on Feb. 18, 2022, entitled "Electro-Optic Element Electrode," the disclosure of which is hereby incorporated by reference in its entirety.

FIELD OF INVENTION

The present disclosure relates, in general, to electro-optic elements and, more particularly, to electro-optic element electrodes.

DETAILED DESCRIPTION

Figure 1:
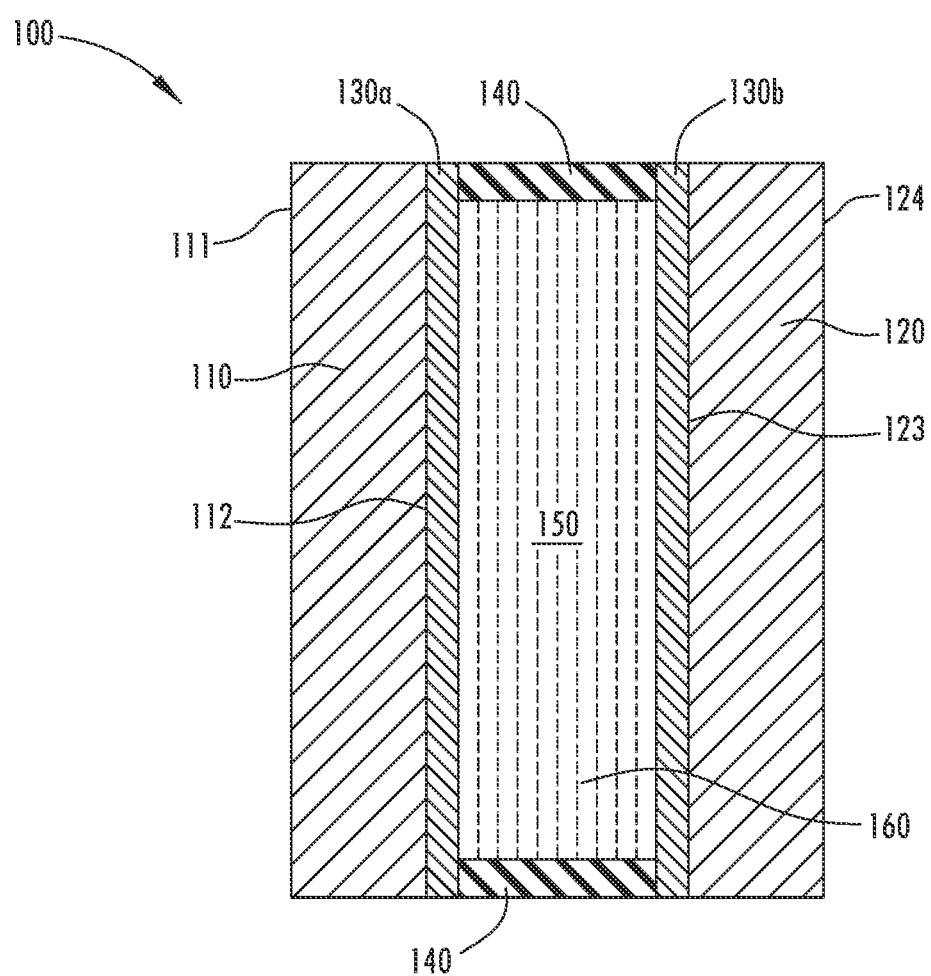
FIG. 1: A cross-sectional schematic representation of an embodiment of an electro-optic element.

For the purposes of description herein, the specific devices and processes illustrated in the attached drawings and described in this disclosure are simply exemplary embodiments of the inventive concepts defined in the appended claims. Hence, specific characteristics relating the embodiments disclosed herein are not limiting, unless the claims expressly state otherwise.

In essence, electro-optic elements may comprise two substrates, an electrode on each substrate, and an electro-optic medium disposed between the two electrodes. However, Electro-optic elements are susceptible to undesirable reflections at optical transitions between adjoining materials of the element, forming an interface. These reflections are particularly problematic for certain applications, such as eyewear, where optical quality is most important. The magnitude of a reflection at the interface of two bulk materials are controlled by Fresnel Equation (simplified for normal incidence) below:

$$R = \frac{(n_1 - n_2)^2}{(n_1 + n_2)^2}$$

where R is the reflectance, $n_1$ is the refractive index of one of the materials of the interface at a specified wavelength of light, and $n_2$ is the refractive index of the other material of the interface at the same wavelength. Accordingly, a significant cause of these undesirable reflections are refractive index differences between the materials of the optical transitions. These relationships and other related teachings are outlined in *Thin-Film Optical Filters*, Third Edition, by H. Angus Macleod (ISBN 0-7503-0688-2).

Accordingly, these reflections may be managed by adding intermediate layers, having intermediate indices of refraction, between materials having substantial gaps in refractive indices. Functionally, the addition of the proper intermediate index material(s) serves to reduce reflectance through destructive interference caused by optical phase change in the intermediate layer(s).

One optical transition that is a substantial source of these undesirable reflections occurs between a substrate of the electro-optic element and an electro-optic medium of the electro-optic element. However, this transition comprises an electrode. Conductivity in a Z-direction of the electrode must be maintained. The Z-direction includes conductivity between the electrode conductor and the electro-optic medium. Further, the electrode must have sufficient transparency. A common material for these electrodes is a transparent conductive oxide (TCO), such as indium tin oxide (ITO). To maintain satisfactory electrode performance, the TCO layer needs to be adjacent the electro-optic medium, as an intermediate index layer between the two could compromise the electrical contact of the electrode with the electro-optic medium, as most materials with appropriate refractive indices are insulators. Unfortunately, commonly used liquid phase electro-optic media may have an index of refraction of around 1.41 at 550 nm and the ITO may have an index of refraction of around 1.85 at 550 nm. Accordingly, a substantial reflection may result. Specifically, a first reflection may result from the interface forming an optical transition between the ITO and the electro-optic medium. Additionally, a second reflection may also result from the interface forming an optical transition between the ITO and the substrate.

To minimize the reflection due to the optical transition between the ITO and the substrate, an intermediate index layer may be added. Additionally, because the additional intermediate index layer does not interfere with the electrical continuity between the electrode conductor—the ITO—and the electro-optic medium, this modification is effective and does not substantially deteriorate electrode performance.

To minimize the reflection due to the optical transition between the ITO and the electro-optic medium, the solution would be to add an intermediate index layer between the ITO and the electro-optic medium. However, this is not an effective solution as such a layer could have a substantial interference with the electrical conductivity of the electrode with the electro-optic medium in the Z-direction. Accordingly, an additional layer may be utilized on the other side of the ITO layer—between the ITO and the substrate—that would serve as the dominant reflection source and allow the ITO to serve as an intermediate index layer to it, and thus exhibit anti-reflective properties. Further, in such an instance, the ITO layer may be tuned to a quarter wave thickness.

To determine the index or refraction needed for the intermediate index layer tuned to a quarter wave optical thickness and placed between two materials, the root-mean-square of the refractive indices may be calculated, as shown below:

$$n_{AR} = \sqrt{\frac{(n_1^2 + n_2^2)}{2}}$$

where $n_{AR}$ is the optimal refractive index, at a specified wavelength, of the intermediate index layer; $n_1$ is the refractive index, at the specified wavelength, of one of the materials of the interface; and $n_2$ is the refractive index, at the same wavelength, of the other material of the interface. Therefore, in the present instance, the ITO may be reduced to a quarter wave optical thickness, and would be put into the equation as $n_{AR}$. Additionally, $n_1$ would be the refractive index of the electro-optic medium, and $n_2$ would be the optimal refractive index of the additional layer. Accordingly, this equation may be rearranged to solve for the needed refractive index of the additional layer.

Utilizing the above equation, it can be found that the TCO/EO fluid interface requires an additional layer with a high refractive index. Specifically, using the ITO and electro-optic media indices detailed above, a refractive index of approximately 1.68 at 550 nm is needed. However, due to the required properties of the electrode, one may not simply add a layer having such a refractive index. The layer must be substantially conductive to preserve the Z-directional conductivity of the electrode, must be sufficiently transparent, and must have the appropriate refractive index, not to mention the materials of the layer additionally need to be readily available and cost effective. However, most materials that exhibit the requisite transparency and refractive index, are insulative, and are thus not suitable for utilization in the electrode. Accordingly, there are substantial material limitations inhibiting the desired reduction of reflectance at the electrode/EO fluid interface of the electro-optic element.

The present disclosure is directed to an electro-optic element 100 with an improved electrode. Accordingly, FIG. 1 illustrates a cross-sectional representation of an embodiment of an electro-optic element 100. Electro-optic element 100 may comprise a first substrate 110, a second substrate 120, a plurality of electrodes 130, a seal 140, a chamber 150, and/or an electro-optic medium 160. Further, electro-optic element 100 may be operable between a substantially activated state and a substantially un-activated state. Operation between such states may correspond to a variable transmissivity of electro-optic element 100. Electro-optic element 100, for example, may be incorporated into a rearview assembly, a window, a sunroof, a light filter, a heads-up display, and/or one or more eyewear lens.

First substrate 110 may be substantially transparent in the visible and/or infrared regions of the electromagnetic spectrum. Further, first substrate 110 may have a first surface 111 and a second surface 112. First surface 111 and second surface 112 may be disposed on opposite sides of first substrate 110. Additionally, first substrate 110, for example, may be fabricated from any of a number of materials, such as alumino-silicate glass, such as Falcon commercially available from AGC; boroaluminosilicate ("BAS") glass; polycarbonate, such as ProLens® polycarbonate, commercially available from Professional Plastics, which may be hard coated; polyethylene terephthalate, such as but not limited to Spallshield® CPET available from Kuraray®; soda lime glass, such as ultra-clear soda lime glass; float glass; natural and synthetic polymeric resins and plastics, such as polyethylene (e.g., low and/or high density), polyethylene terephthalate (PET), polyethylene naphthalate (PEN), polycarbonate (PC), polysulfone, acrylic polymers (e.g., poly(methyl methacrylate) (PMMA)), polymethacrylates, polyimides, polyamides (e.g., a cycloaliphatic diamine dodecanedioic acid polymer (i.e., Trogamid CX7323)), epoxies, cyclic olefin polymers (COP) (e.g., Zeonor 1420R), cyclic olefin copolymers (COC) (e.g., Topas 6013 S-04 or Mitsui Apel), polymethylpentene, cellulose ester based plastics (e.g., cellulose triacetate), transparent fluoropolymer, polyacrylonitrile; and/or combinations thereof. While particular substrate materials are disclosed, for illustrative purposes only, numerous other substrate materials are likewise suitable—so long as the materials are at least substantially transparent and exhibit appropriate physical properties such as strength and tolerance to conditions of the device's environment, such as ultra-violet light exposure from the sun, humidity, and temperature extremes. In some embodiments, first substrate may have an index of refraction of about 1.51 at 550 nm.

Similarly, second substrate 120 may have a third surface 123 and a fourth surface 124. Third surface 123 and fourth surface 124 may be disposed on opposite sides of second substrate 120. Additionally, second substrate 120 may be disposed in a substantially parallel and spaced apart relationship relative first substate 110. Further, third surface 123 may face second surface 112. In some embodiments, second substrate 120 may be substantially transparent in the visible and/or infrared regions. Accordingly, second substrate 120 may be comprised of the same or similar materials suitable for first substate 110. Thus, in some embodiments, second substrate 120 may also have an index of refraction of about 1.51 @ 550 nm. In other embodiments, such as for a rearview mirror assembly, substantial transparency may not be necessary. In such an embodiment, second substrate 120 may also be selected from substantially opaque and/or reflective materials.

The plurality of electrodes 130 may comprise a first electrode 130a and a second electrode 130b. The electrodes 130 may comprise electrically conductive materials. Further, the first and/or second electrodes 130a, 130b may be substantially transparent in the visible region of the electromagnetic spectrum and generally resistant to corrosion from materials within electro-optic element 100. For example, the electrically conductive material may be a transparent conductive oxide (TCO), such as fluorine doped tin oxide (FTO), indium tin oxide (ITO), indium zinc oxide (IZO), or aluminum doped zinc oxide (AZO). First electrode 130a may be associated with second surface 112 and substantially transparent in the visible region of the electromagnetic spectrum. Similarly, second electrode 130b may be associated with third surface 123. Further, in some embodiments, the electrically conductive material of second electrode 130b may be reflective or comprise a reflective element that is substantially reflective in the visible region of the electromagnetic spectrum.

Seal 140 may be disposed in a peripheral manner to, at least in part, define chamber 150. Chamber 150 is disposed between first substrate 110 and second substrate 120. Accordingly, chamber 150 may be defined by seal 140 in conjunction with at least two of: first substrate 110, second substrate 120, first electrode 130a, and second electrode 130b. In some embodiments, chamber 150 may, more specifically, be defined by seal 150, first electrode 130a, and second electrode 130b. Seal 140 may comprise any material capable of being bonded to the at least two of: first substrate 110, second substrate 120, first electrode 130a, and second electrode 130b, to in turn inhibit oxygen and/or moisture from entering chamber 150, as well as inhibit electro-optic medium 160 from inadvertently leaking out. Seal 140, for example, may include epoxies, urethanes, cyanoacrylates, acrylics, polyimides, polyamides, polysulfides, phenoxy resin, polyolefins, and silicones.

Electro-optic medium 160 may be disposed in chamber 150. Thus, electro-optic medium 160 may be disposed between the first and second electrodes 130a, 130b. Further, electro-optic medium 160 may be operable between substantially activated and un-activated states based, at least in part, on exposure to a particular electrical potential. Accordingly, electro-optic medium 160 may be an electrochromic medium, a polymer dispersed liquid crystal (PDLC) medium, twisted nematic liquid crystal medium, or a suspended particle liquid crystal medium. In some embodiments, electro-optic medium 160 may have an index of refraction of about 1.41 at 550 nm.

In embodiments where electro-optic medium 160 is electrochromic, in an activated state, electro-optic medium 160 may be operable to exhibit a change, relative an un-activated state, in its extinction coefficient at one or more wavelengths in the electromagnetic spectrum. In some such embodiments, this change may occur in the visible region of the electromagnetic spectrum.

In some embodiments, electro-optic medium 160 may comprise at least one solvent, at least one anodic material, and/or at least one cathodic material. Accordingly, in some embodiments, electro-optic medium 160 may be a fluid, or said another way, in liquid or solution phase. Alternatively, in other embodiments, electrochromic medium 160 may comprise at least one anodic material and/or at least one cathodic material immobilized in a matrix associated with an electrode 130. Such a construction may be referred to as having memory chemistry. Further, in embodiments where electro-optic medium 160 is an electrochromic medium, while both anodic and cathodic materials may be electroactive, at least one of them is electrochromic. Thus, at least one of which may be regarded as an electrochromic component. Regardless of its ordinary meaning, the term "electroactive" will be defined herein as a material that undergoes a modification in its oxidation state upon exposure to a particular electrical potential. Thus, electro-optic medium 160 may be operable to enter and/or maintain an activated state upon exposure to an electrical potential. In some embodiments, such as solution phase embodiments, electro-optic medium 160 may be operable to automatically revert back to an un-activated state upon removal of the electrical potential. In other embodiments, such as memory chemistry embodiments, electro-optic medium 160 may be operable to maintain the activated state until exposure to a different electrical potential. In some instances, the different electrical potential may be a short of the electrical circuit, and thus a substantially zero potential. Additionally, the term "electrochromic" will be defined herein, regardless of its ordinary meaning, as a material that exhibits a change in its extinction coefficient at one or more wavelengths upon exposure to a particular electrical potential difference. Accordingly, in an activated state, electro-optic medium 160 may be operable to exhibit a change, relative an un-activated state, in its extinction coefficient at one or more wavelengths in the electromagnetic spectrum. In some embodiments, this change may occur in the visible region of the electromagnetic spectrum. In other words, the electrochromic medium may be variably transmissive or operable to dim.

The electrochromic component may be a single-layer, single-phase component, multi-layer component, or multiphase component, as described in U.S. Pat. No. 5,928,572 entitled "Electrochromic Layer and Devices Comprising Same," U.S. Pat. No. 5,998,617 entitled "Electrochromic Compounds," U.S. Pat. No. 6,020,987 entitled "Electrochromic Medium Capable of Producing a Pre-selected Color," U.S. Pat. No. 6,037,471 entitled "Electrochromic Compounds," U.S. Pat. No. 6,141,137 entitled "Electrochromic Media for Producing a Preselected Color," U.S. Pat. No. 6,241,916 entitled "Electrochromic System," U.S. Pat. No. 6,193,912 entitled "Near Infrared-Absorbing Electrochromic Compounds and Devices Comprising Same," U.S. Pat. No. 6,249,369 entitled "Coupled Electrochromic Compounds With Photostable Dication Oxidation States," U.S. Pat. No. 6,137,620 entitled "Electrochromic Media With Concentration-Enhanced Stability, Process for the Preparation Thereof and Use in Electrochromic Devices," U.S. Pat. No. 6,519,072, entitled "Electrochromic Device"; and International Patent Publication Nos. WO 98/42796 entitled "Electrochromic Polymeric Solid Films, Manufacturing Electrochromic Devices Using Such Solid Films, and Processes For Making Such Solid Films And Devices," and WO 99/02621 entitled "Electrochromic Polymer Systems," which are herein incorporated by reference, in their entirety.

Figure 2:
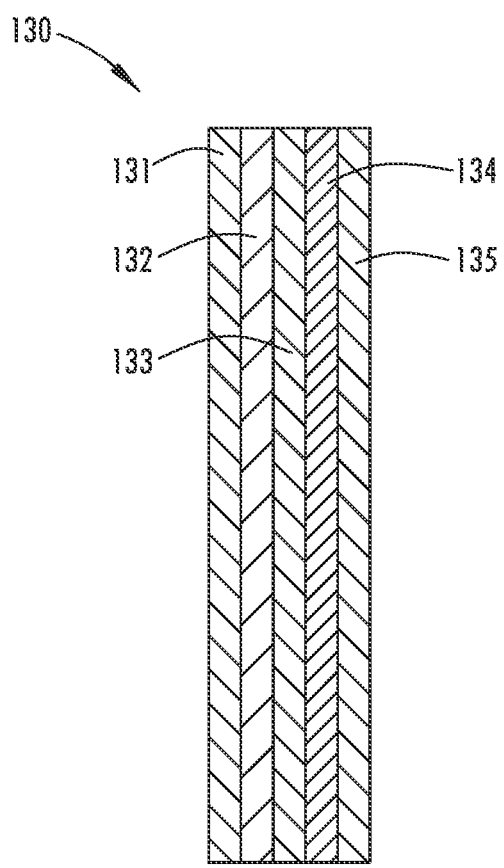
FIG. 2: An exemplary embodiment of an electro-optic element electrode having a reduced reflectance construction.
Figure 3:
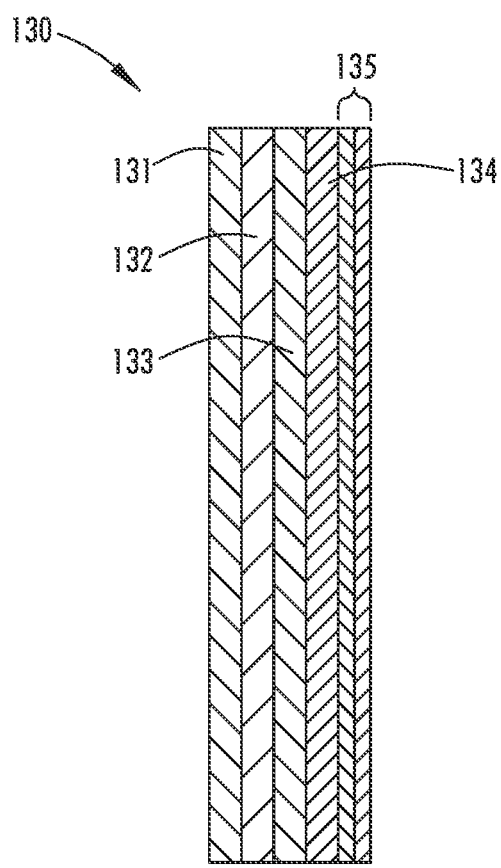
FIG. 3: An exemplary embodiment of an electro-optic element electrode having a reduced reflectance construction.

Additionally, at least one of the first and second electrodes 130a, 130b may have a reduced reflectance construction. An exemplary reduced reflectance construction is shown in FIGS. 2 and 3. Accordingly, the electrode 130 may comprise a first TCO layer 131, a high refractive index layer 132, a first intermediate layer 133, a second ITO layer 134, and/or a second intermediate layer 135. In some embodiments, this electrode with the reduced reflectance construction may have a resistance of less than or equal to about 12, 11, 10, and/or 9 ohms/square. In some embodiments, the optical transition between the substrate associated with the reduced reflectance electrode and the electro-optic medium 160, may have a total eye weighted reflectance of less than 0.3, 0.2, or 0.1 percent.

First TCO layer 131 may be disposed immediately adjacent electro-optic medium 160. In some embodiments, first TCO layer 131 may be ITO. Accordingly, first TCO layer 131 may have an index of refraction of about 1.85 at 550 nm. Additionally, first TCO layer 131 may have a first side proximal the electro-optic medium 160 and a second side distal the electro-optic medium 160, relative one another. In some embodiments, first TCO layer 131 may have about a quarter wave optical thickness at 550 nm. As such, the thickness may be about 77 nm.

High refractive index layer 132 may be disposed such that first TCO layer 131 is between it and electro-optic medium 160. In other words, high refractive index layer 132 may be disposed between first TCO layer 131 and a respective first or second substrate 110, 120 with which the electrode is associated. In some embodiments, high refractive index layer 132 may be substantially mono-lithic. Additionally, high refractive index layer 132 may have a first side proximal the electro-optic medium 160 and a second side distal the electro-optic medium 160, relative one another. In some embodiments, first side of high refractive index layer 132 may be immediately adjacent to second side of first TCO layer 131. Further, high refractive index layer 132 may have a refractive index such that first TCO layer 131 may be operable to serve as the intermediate refractive index layer for high refractive index layer 132 and thus anti-reflect reflections from the first side of high refractive index layer 132. These anti-reflected reflections from the first side of high refractive index layer 132 may be from the optical transition between high refractive index layer 132 and electro-optic medium 160. High refractive index layer 132 may have a high index of refraction. For example, high refractive index layer 132 may have a refractive index of greater than about 2.0, 2.1, 2.2, 2.3, 2.4, 2.5, 2.6, or 2.7 at 550 nm. In some such embodiments, first anti-reflective layer 132 may comprise titanium di-oxide ($TiO_2$). Accordingly, first anti-reflective layer 132 may have a refractive index of about 2.65 at 550 nm. Additionally, the $TiO_2$ may be substantially exclusively intrinsically doped to overcome its otherwise insulative properties. The $TiO_2$ may be intrinsically doped by growth of the Anatase phase of $TiO_2$ under slightly sub-stoichiometric conditions for oxygen. This may result in oxygen vacancies, providing unpaired electrons to populate the conduction band. As such, the $TiO_2$ may have conductivity so as to not interfere with the Z-directional conductivity of the respective electrode. The Z-directional conductivity is herein defined as the conductivity of the electrode along a path bisecting the layers of the electrode. In some embodiments, high refractive index layer 132 may have a half wave optical thickness. As such, the thickness may be about 104 nm.

First intermediate layer 133 may be disposed such that high refractive index layer 132 is between it and first TCO layer 131 and/or electro-optic medium 160. In other words, first intermediate layer 133 may be disposed between high refractive index layer 132 and a respective first or second substrate 110, 120, depending on which substrate the electrode is associated with. Additionally, first intermediate layer 133 may have a first side proximal the electro-optic medium 160 and a second side distal the electro-optic medium 160, relative one another. In some embodiments, first side of first intermediate layer 133 may be immediately adjacent to second side of high refractive index layer 132. Further, first intermediate layer 133 may be operable to serve as an intermediate refractive index, anti-reflective layer for the interface at the second side of high refractive index layer 132 and/or the transition between high refractive index layer 132 and the respective first or second substrate 110, 120. The index of refraction of first intermediate layer 133 may be between the indices of refraction of high refractive index layer 132 and the respective substate with which the electrode is associated. Further, in some such embodiments, first intermediate layer 133 may have an index of refraction of less than about 2.7, 2.6, 2.5, 2.4, 2.3, 2.2, or 2.1 and/or greater than about 1.3, 1.4, 1.5, 1.6, 1.7, 1.8, or 1.9 at 550 nm. In some such embodiments, first intermediate layer 133 may have a refractive index of about 2.00 at 550 nm. Accordingly, first intermediate layer may comprise AZO. Further, first intermediate layer 133 may have a quarter wave thickness. As such, the AZO may have a thickness of about 66 nm. Accordingly, in embodiments where first anti-reflective layer 133 is a $TiO_2$ layer, the $TiO_2$ layer may ultimately be disposed between an ITO layer and an AZO layer. In some embodiments, first intermediate layer 133 may be a monolithic layer. In other embodiments, first intermediate layer 133 may have a multi-sub-layer construction.

Second TCO layer 134 may be disposed between first intermediate layer 133 and the respective substrate with which the electrode 130 is associated. Second TOC layer 134 may have the advantage of increasing the electrical conductivity of the respective electrode 130 as the conductivity of first TCO layer 130 may not alone be sufficient when having a quarter wave optical thickness. In some embodiments, second TCO layer 134 may be immediately adjacent first intermediate layer 133. Additionally, in some embodiments, second TCO layer 134 may be ITO. Accordingly, second TCO layer 134 may have an index of refraction of about 1.85 at 550 nm. Thus, first TCO layer 131 and second TCO layer 134 may be comprised of the same material. As such, in embodiments where first anti-reflective layer 133 is a $TiO_2$ layer, the $TiO_2$ layer may ultimately be disposed between two TCO or ITO layers. Additionally, second TCO layer 134 may have a first side proximal the electro-optic medium 160 and a second side distal the electro-optic medium 160, relative one another. In some embodiments, second TCO layer 134 may have about a half wave optical thickness at 550 nm. As such, the thickness may be about 145 nm.

Second intermediate layer 135 may be disposed between second TCO layer 134 and the respective substrate with which the electrode 130 is associated. Additionally, second intermediate layer 135 may have a first side proximal the electro-optic medium 160 and a second side distal the electro-optic medium 160, relative one another. In some embodiments, first side of second intermediate layer 135 may be immediately adjacent to second side of second TCO layer 134. Further, second intermediate layer 135 may be operable to serve as an intermediate refractive index anti-reflective layer for the interface at the second side of second TCO layer 134 and/or the transition between second TCO layer 134 and the respective substate with which the electrode 130 is associated. In some embodiments, second intermediate layer 135 may be mono-lithic. The refractive index of second intermediate layer may be between the indices of refraction of second TCO layer 134 and the respective substate with which the electrode is associated. Further, in some such embodiments, first intermediate layer 133 may have an index of refraction of less than about 1.7, 1.8, or 1.9 and/or greater than about 1.3, 1.4, or 1.5 at 550 nm. In some such embodiments, second intermediate layer 135 may be comprised of $TiSi_2O_6$. Accordingly, second intermediate layer 135 may have a refractive index of about 1.69. In some such embodiments, the $TiSi_2O_6$ may form a layer about a quarter wave thick. As such, the thickness of the $TiSi_2O_6$ may be about 77 nm. In other embodiments, as shown in FIG. 3, second intermediate layer 135 may have a multi-layer composition. For example, second intermediate layer may be comprised of a $SiO_2$ and $Nb_2O_5$ bi-layer. In some such embodiments, the $SiO_2$ layer may be disposed proximal to second TCO layer 134 and the $Nb_2O_5$ may be disposed distal to second TCO layer 134, relative to one another. As such, the $SiO_2$ may be disposed between the $Nb_2O_5$ layer and second TCO layer 134. In other words, $Nb_2O_5$ may be disposed between the $SiO_2$ layer and the respective substrate with which the electrode 130 is associated. Further, the $SiO_2$ portion may have about a 0.42 quarter wave thickness. As such, the $SiO_2$ may have a thickness of about 37 nm. Conversely, the $Nb_2O_5$ portion may have about a 0.11 quarter wave thickness. As such, the $Nb_2O_5$ may have a thickness of about 7 nm. Therefore, together, the $SiO_2$ and $Nb_2O_5$ layers may have about a half a quarter wave thickness. Further, the $SiO_2$ layer and the $Nb_2O_5$ layer may operate together to serve as an intermediate refractive index anti-reflective layer for the interface at the second side of second TCO layer 134 and/or the transition between second TCO layer 134 and the respective substate with which the electrode 130 is associated.

In operation, an electrical potential may be provided to the first and second electrodes 130a, 130b. The first and second electrodes 130a, 130b may accordingly apply the electrical potential to electro-optic medium 160. Upon application of the electrical potential, electro-optic medium 160 may change to a substantially activated state, such as a state of reduced transmittance.

In this document, relational terms, such as "first," "second," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; B and C in combination; or A, B, and C in combination.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question is not readily apparent, the wavelengths in question shall generally refer to visible light.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. An electro-optic element comprising:
a first substrate having first and second surfaces disposed on opposite sides thereof;
a second substrate having third and fourth surfaces disposed on opposite sides thereof, the second substrate disposed in a substantially parallel, spaced apart relationship relative the first substrate such that the second and third surfaces face one another;
a first electrode associated with the second surface;
a second electrode associated with the third surface; and
an electro-optic medium disposed between the first and second electrodes;
wherein at least one of the first and second electrodes have a reduced reflectance construction, comprising:
a first transparent conductive oxide layer,
a high refractive index layer disposed such the first transparent conductive oxide layer is between the high refractive index layer and the electro-optic medium, the high refractive index layer comprising titanium di-oxide; and
a second transparent conductive oxide layer disposed such that the high refractive index layer is disposed between the first and second transparent conductive oxide layers.

2. The electro-optic element of claim 1, wherein the first transparent conductive oxide layer is indium tin oxide.

3. The electro-optic element of claim 1, wherein the electrode having the reduced reflectance construction has a resistance of less than or equal to 12 ohms per square.

4. The electro-optic element of claim 1, wherein the first transparent conductive oxide layer is disposed immediately adjacent to the electro-optic medium.

5. The electro-optic element of claim 1, wherein:
the high refractive index layer has a first side and a second side, the first side being proximal to the electro-optic medium relative the second side, and
the first transparent conductive oxide layer is operable to anti-reflect reflections from a transition between the high refractive index layer and the electro-optic medium.

6. The electro-optic element of claim 1, wherein the first anti-reflective layer has an index of refraction greater than 2.3 at 550 nm.

7. The electro-optic element of claim 1, wherein the titanium di-oxide is substantially exclusively intrinsically doped.

8. The electro-optic element of claim 1, wherein the titanium di-oxide does not substantially interfere with a Z-directional conductivity of the reduced reflectance electrode.

9. The electro-optic element of claim 1, wherein the high refractive index layer has about a half wave optical thickness.

10. The electro-optic element of claim 1, wherein the high refractive index layer is disposed immediately adjacent to the first transparent conductive oxide layer.

11. The electro-optic element of claim 1, wherein the first transparent conductive oxide layer has about a quarter wave thickness.

12. The electro-optic element of claim 1, wherein both the first and second transparent conductive oxide layers are indium tin oxide.

13. The electro-optic element of claim 1, further comprising a first intermediate layer disposed between the second transparent conductive oxide layer and the high refractive index layer, the first intermediate layer having a refractive index between the refractive indices of the second transparent conductive oxide layer and the high refractive index layer.

14. The electro-optic element of claim 13, wherein the first intermediate layer is aluminum zinc oxide.

15. The electro-optic element of claim 13, wherein the first intermediate layer has about a quarter wave optical thickness.

16. The electro-optic element of claim 13, wherein the first intermediate layer is immediately adjacent to the high refractive index layer.

17. The electro-optic element of claim 13, further comprising a second intermediate layer disposed between the second transparent conductive oxide layer and the respective substrate with which the reduced reflectance electrode is associated, the second intermediate layer having a refractive index between the refractive indices of the second transparent conductive oxide layer and the respective substrate witch which the reduced reflectance electrode is associated.

18. The electro-optic element of claim 17, wherein the second intermediate layer is TiSi2O6.

19. The electro-optic element of claim 17, wherein the second intermediary layer comprises a bi-layer of SiO2 and Nb2O5, the SiO2 proximal to the first anti-reflective layer relative the Nb2O5.

* * * * *